(12) United States Patent
Petruska et al.

(10) Patent No.: US 7,178,424 B2
(45) Date of Patent: Feb. 20, 2007

(54) PINION UNIT IN AXLE ASSEMBLY

(75) Inventors: Paul H. Petruska, Royal Oak, MI (US); Shad J. Falls, Perrysburg, OH (US)

(73) Assignee: American Axle & Manufacturing, Inc., Detroit, MI (US)

( * ) Notice: Subject to any disclaimer, the term of this patent is extended or adjusted under 35 U.S.C. 154(b) by 199 days.

(21) Appl. No.: 11/005,569

(22) Filed: Dec. 6, 2004

(65) Prior Publication Data

US 2006/0117906 A1 Jun. 8, 2006

(51) Int. Cl.
F16H 57/02 (2006.01)
F16H 57/04 (2006.01)
F16H 61/00 (2006.01)

(52) U.S. Cl. .................... 74/606 R; 475/160

(58) Field of Classification Search ............. 74/606 R; 475/159, 160
See application file for complete search history.

(56) References Cited

U.S. PATENT DOCUMENTS

| | | |
|---|---|---|
| 2,019,464 A | 10/1935 | R.M. Riblet |
| 2,040,803 A | 5/1936 | T.V. Buckwalter |
| 3,628,835 A | 12/1971 | Cornish |
| 3,811,743 A | 5/1974 | Wren |
| 3,905,086 A | 9/1975 | Tetlak |
| 3,913,992 A | 10/1975 | Scott et al. |
| 4,271,717 A | 6/1981 | Millward et al. |
| 4,334,720 A | 6/1982 | Signer |
| 4,479,682 A | 10/1984 | Olivier |
| 4,656,885 A * | 4/1987 | Hori et al. ................ 74/467 |
| 4,677,871 A * | 7/1987 | Taniyama et al. ............ 74/467 |
| 4,797,014 A | 1/1989 | Nicolich |
| 4,968,157 A | 11/1990 | Chiba |
| 5,009,523 A | 4/1991 | Folger et al. |
| 5,009,524 A | 4/1991 | Dittenhoefer |
| 5,114,248 A * | 5/1992 | Harsdorff ................. 384/473 |
| 5,232,291 A | 8/1993 | Kuan |
| 5,645,363 A | 7/1997 | Dafforn et al. |
| 5,803,616 A | 9/1998 | Persson et al. |
| 6,105,724 A | 8/2000 | Stitz et al. |
| 6,120,188 A | 9/2000 | Fujinaka et al. |
| 6,152,606 A | 11/2000 | Shirosaki et al. |

(Continued)

FOREIGN PATENT DOCUMENTS

DE 2733294 7/1977

(Continued)

Primary Examiner—Tisha Lewis
(74) Attorney, Agent, or Firm—Harness, Dickey & Pierce, P.L.C.

(57) ABSTRACT

An axle assembly includes an axle housing having a main body and defining an internal cavity. The axle housing includes a first and second opening defined in the main body and adapted to support a first and second differential bearing respectively. A differential assembly is supported in the axle housing with the first and second differential bearings. The main body defines an inner mounting surface, an outer face and an inner circumferential surface extending between the inner mounting surface and the outer face. The inner circumferential surface defines a third opening. The main body defines a relief formed through the inner mounting surface and extending through a portion of the inner circumferential surface. The relief defines a fluid communication path for delivering fluid to a pinion bearing assembly arranged in the third opening.

21 Claims, 6 Drawing Sheets

U.S. PATENT DOCUMENTS

| | | |
|---|---|---|
| 6,293,704 B1 | 9/2001 | Gradu |
| 6,328,478 B1 | 12/2001 | Fukuda et al. |
| 6,428,212 B1 | 8/2002 | Tanaka |
| 6,474,444 B1 | 11/2002 | Mochizuki |
| 6,478,471 B2 | 11/2002 | Ishida et al. |
| 6,513,982 B2 | 2/2003 | Boyd et al. |
| 6,523,909 B1 | 2/2003 | Nakamura et al. |
| 6,554,475 B2 | 4/2003 | Yamada |
| 6,669,374 B2 | 12/2003 | Miyazaki |
| 6,672,679 B2 | 1/2004 | Kaneko |
| 6,733,180 B2 | 5/2004 | Nakamura |
| 6,964,320 B2 * | 11/2005 | Metelues et al. ............ 184/6.2 |
| 2003/0108261 A1 | 6/2003 | Yokota et al. |

FOREIGN PATENT DOCUMENTS

| | | |
|---|---|---|
| GB | 2202010 | 2/1987 |
| JP | 10103454 | 4/1998 |
| JP | 2001159460 | 6/2001 |
| JP | 2002147583 | 5/2002 |
| JP | 2003097675 | 4/2003 |

* cited by examiner

PINION UNIT IN AXLE ASSEMBLY

FIELD OF THE INVENTION

The present invention relates to axle assemblies and more particularly to an axle housing arrangement for delivering oil to a pinion unit mounted on the axle housing.

BACKGROUND OF THE INVENTION

Some automotive drive axles include an axle housing supporting a differential assembly in an internal cavity. The differential assembly includes a gearset which is supported within a differential housing to facilitate relative rotation between a pair of output shafts. The gearset may include a pair of helical side gears that are splined to the ends of axle shafts. The helical side gears are meshed with helical pinions rotatably supported on a cross pin coupled to the differential housing. As an alternative, paired sets of meshed pinions rotatably supported in bores formed in the housing can be meshed with the side gears to define a parallel axis differential. In response to speed differentiation between the output shafts, torque transmitted through meshed engagement of the side gears and pinions generates thrust forces that are exerted by the gear components against the wall surface of the differential housing to frictionally limit the speed differentiation and proportionally deliver torque between the output shafts.

In addition, automotive drive axles typically include a hypoid gearset for changing the direction of power transmission from an axis parallel to the direction of vehicle travel to an axis perpendicular thereto. The hypoid gearset includes a ring gear coupled to the differential housing and a pinion gear journally supported within the axle housing. To facilitate proper function of the drive axle, the differential housing is mounted on a pair of differential bearings.

In some drive axles, the pinion gear is supported by a bearing assembly in a pinion housing or unit. The pinion unit may define a cylindrical body portion and an outer flange portion. The outer flange of the pinion unit is adapted to be secured to the axle housing in an installed position. Typically, the transition between the cylindrical body and the flange portion of the pinion unit comprises an undercut region formed by a machining process necessary for economical manufacturing. In some instances, the undercut region may influence additional stress on the pinion unit during operation causing premature failure.

In a conventional axle housing incorporating a pinion unit, the axle housing is formed by a casting process such as sand casting. After the axle housing is cast, a secondary operation is needed to form an oil feed path in the axle housing. The oil feed path communicates oil from a cavity of the axle housing toward the bearing assembly in the pinion unit.

SUMMARY OF THE INVENTION

An axle assembly includes an axle housing having a main body which defines an internal cavity. The axle housing includes a first and second opening formed in the main body that are adapted to support rotatably first and second differential bearings respectively. A differential assembly is supported in the axle housing by the first and second differential bearings. The main body defines an inner mounting surface, an outer face and an inner circumferential surface extending between the inner mounting surface and the outer face. The inner circumferential surface defines a third opening. The main body defines a relief formed through the inner mounting surface and extending through a portion of the inner circumferential surface.

According to other features, a pinion unit is coupled to the inner mounting surface of the axle housing, the pinion unit supporting a pinion bearing assembly. In addition, the pinion unit defines a passage through an outer circumferential wall. The relief defines a fluid communication path from the internal cavity of the axle housing to the passage in the pinion unit. The passage in the pinion unit communicates fluid from the relief to an outer circumference of the pinion bearing assembly. The relief is further defined by a concave wall extending through the main body and terminates at opposite ends at the inner mounting surface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. The differential assembly according to the present teachings may be utilized with a wide variety of applications and is not intended to be specifically limited to the particular application recited herein.

Figure 1:
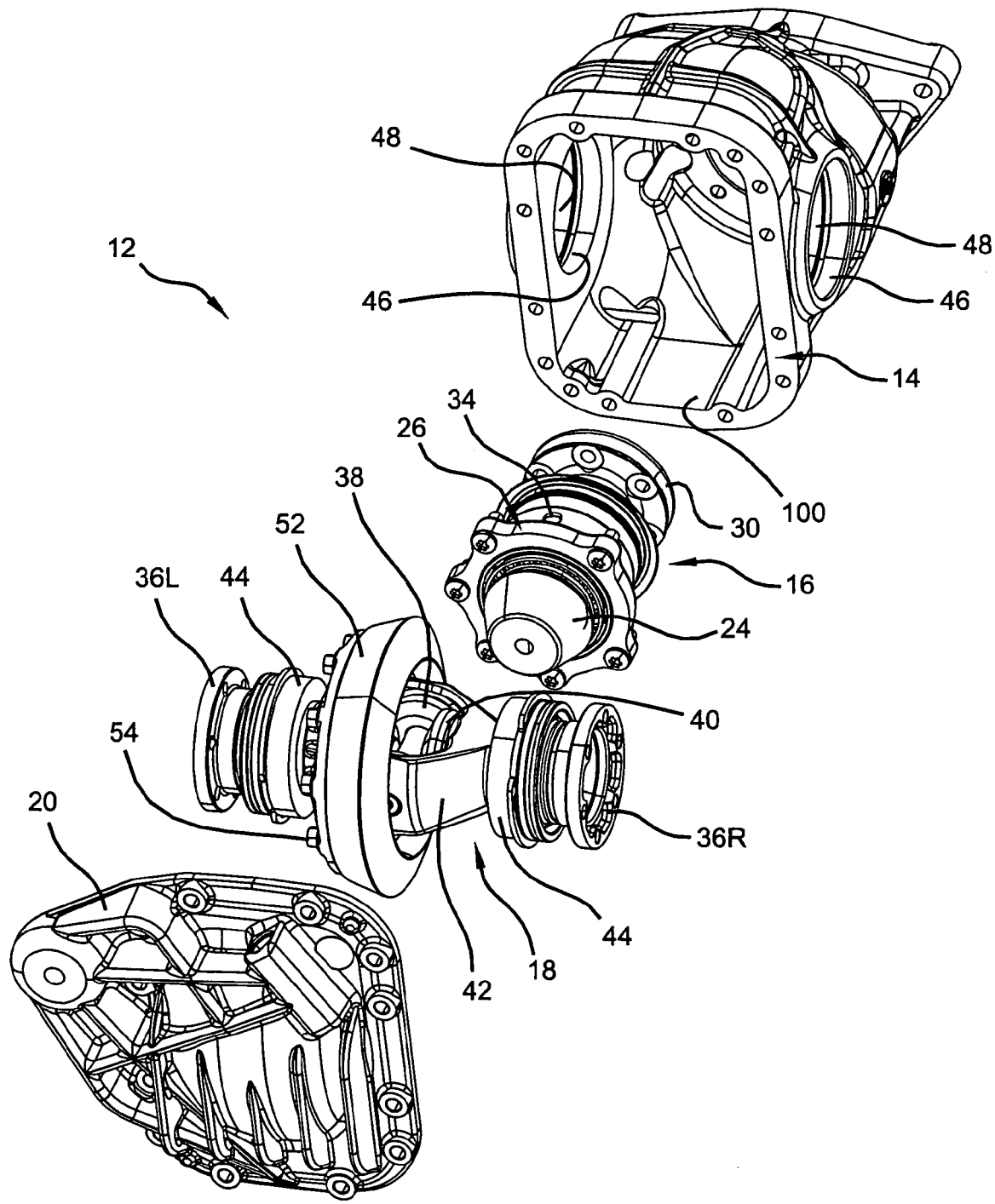
FIG. 1 is an exploded perspective view of portions of an axle assembly according to the present invention.
Figure 2:
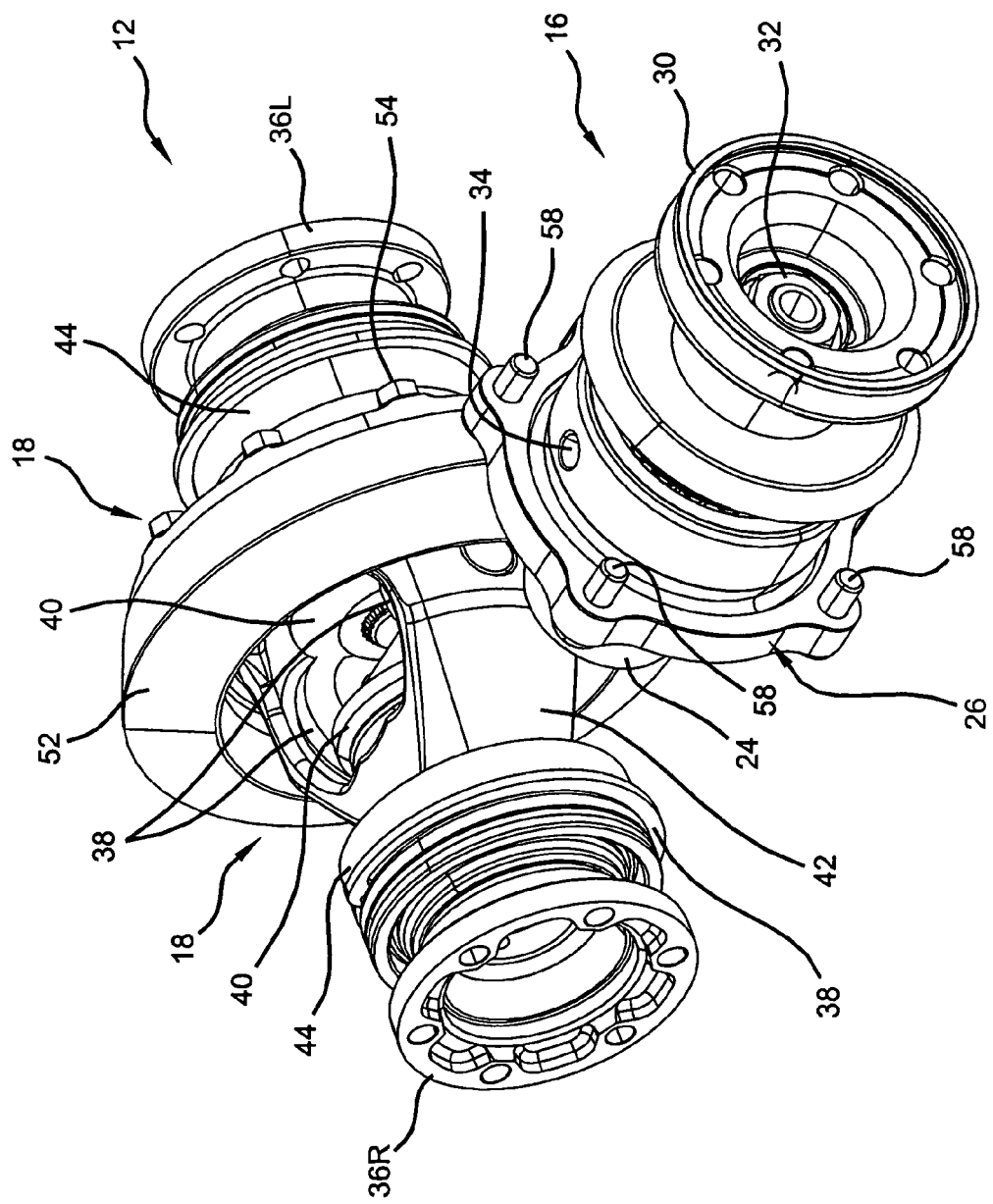
FIG. 2 is a perspective view of the axle assembly of FIG. 1 shown with the axle housing removed and illustrating a differential assembly and a pinion shaft assembly.

As particularly shown in FIGS. 1 and 2, a drive axle assembly 12 is illustrated and generally includes an axle housing 14 for rotatably supporting a pinion shaft assembly 16 and a differential assembly 18. A cover portion 20 is secured to axle housing 14 when assembled. Pinion shaft assembly 16 includes a pinion shaft 22 having a pinion gear 24, a pinion bearing unit 26 for rotatably supporting pinion shaft 22 within a cylinderal cavity 28 formed in axle housing 14, and a drive yoke 30 coupled to an end segment of shaft 22 via a lock nut 32. An oil feed passage 34 is provided in pinion unit 26 for communicating lubricant as will be described in greater detail. Differential assembly 18 functions to transfer power to a pair of axleshafts 36L and 36R while compensating for any difference in axleshaft speed rotation as may occur during a turn or other steering maneuver.

Differential assembly 18 includes a pair of pinion gears 38 and a pair of side gears 40 (more clearly shown in FIG. 2) arranged in a differential housing 42 and drivingly interconnected to corresponding axle shafts 36L and 36R. To facilitate proper function of axle assembly 12, differential assembly 18 is rotatably mounted in housing 14 by a pair of differential bearings 44. Differential bearings 44 are supported by annular walls 46 defining respective openings 48 in axle housing 14 (FIG. 1). It is appreciated that other configurations may be employed for locating differential bearings 44 within axle housing 14. As is conventional, a ring gear 52 is secured via bolts 54 to differential housing 42 and is in meshed engagement with pinion gear 24. Differential assembly 18 is adapted for use in a rear-wheel drive application, however the present invention is contemplated for use in differential assemblies installed in transaxles for use in front-wheel drive vehicles, and/or in transfer cases for use in four-wheel drive vehicles.

With reference now to FIGS. 3 through 6, pinion unit 16 will be described more fully. Pinion unit 26 generally includes a sleeve 60 secured for rotation with pinion shaft 22, a cup 62 secured to axle housing 14, and a pair of laterally spaced bearings 64 and 66. Cup 62 includes a generally cylindrical body portion 67 retained in cavity 28 and an integral flange portion 68. Body portion 67 of cup 62 defines an outboard tapered surface or outboard race 70, an intermediate surface 72 and an inboard tapered surface or inboard race 74. Intermediate surface 72 coincides with oil feed passage 34.

Flange portion 68 includes a series of bores 76 through which a plurality of fasteners 78 (FIG. 3) align with a complementary series of bores 80 (FIG. 5) arranged on an inner mounting surface 82 of axle housing 14. In an installed position (FIG. 3), fasteners 78 locate flange portion 68 of pinion unit 26 to inner mounting surface 82 of axle housing 14 in a secure position. Pinion unit 26 according to the present invention incorporates six bores 76 to accommodate six fasteners 78. A filet 84 (FIG. 6) defines a transition between cylindrical body portion 67 and flange portion 68. Filet 84 reduces stress at an annular interface between cylindrical body portion 67 and the flange portion 68. Filet 84 defines a radius of approximately 3 mm. Flange portion 68 defines a thickness "T" (FIG. 4) of approximately 14 mm. It will be appreciated from the following discussion, that these dimensions have been shown to provide structural and manufacturing advantages. It is understood however, that other dimensions may be employed according to the present teachings while reaching similar results.

The configuration and geometry of pinion unit 26 presents favorable structural and manufacturing advantages over a conventional machined pinion unit. More specifically, the thickness of flange portion 68 contributes to a more robust component during operation of axle assembly 12. Moreover, the thickness of flange portion 68 allows filet 84 and pinion unit 26 as a whole to be formed by a more cost effective forging operation.

Figure 4:
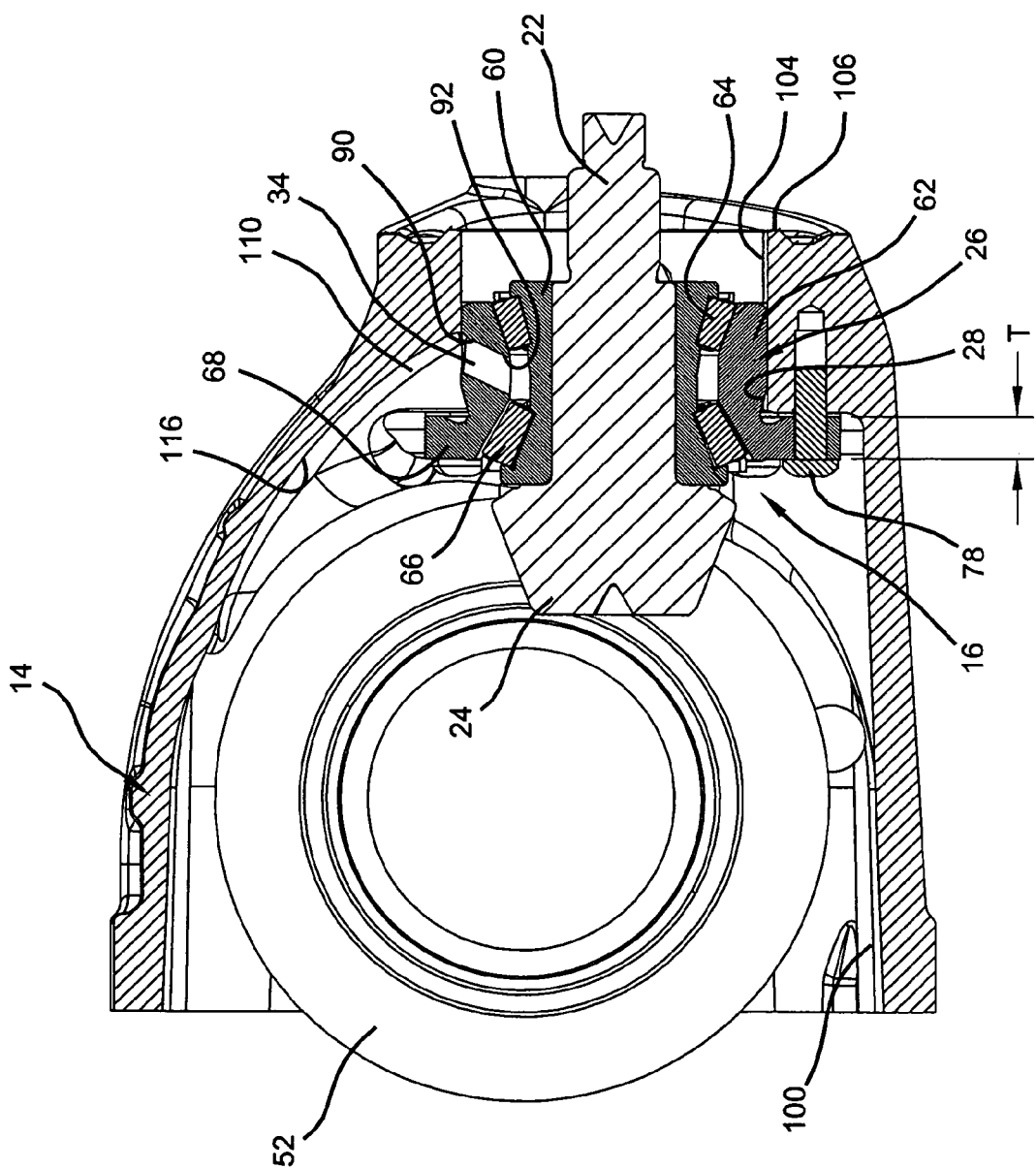
FIG. 4 is a sectional view of the axle assembly taken along line 4—4 of FIG. 3.

With specific reference to FIG. 4, pinion unit 26 defines cup 62 which cooperates with a cone sleeve 60 to support first and second tapered roller bearing units 64 and 66, respectively. More specifically, first tapered roller bearing unit 64 is supported on outboard raceway 70 of cylindrical portion 67 while second tapered roller bearing unit 66 is supported on inboard raceway 74 of cylindrical portion 67. As illustrated in FIG. 4, oil feed passage 34 defines an oil feed inlet 90 and an oil feed outlet 92. Oil feed outlet 92 terminates at a location between the first and second tapered roller bearing units 64 and 66, respectively.

Figure 3:
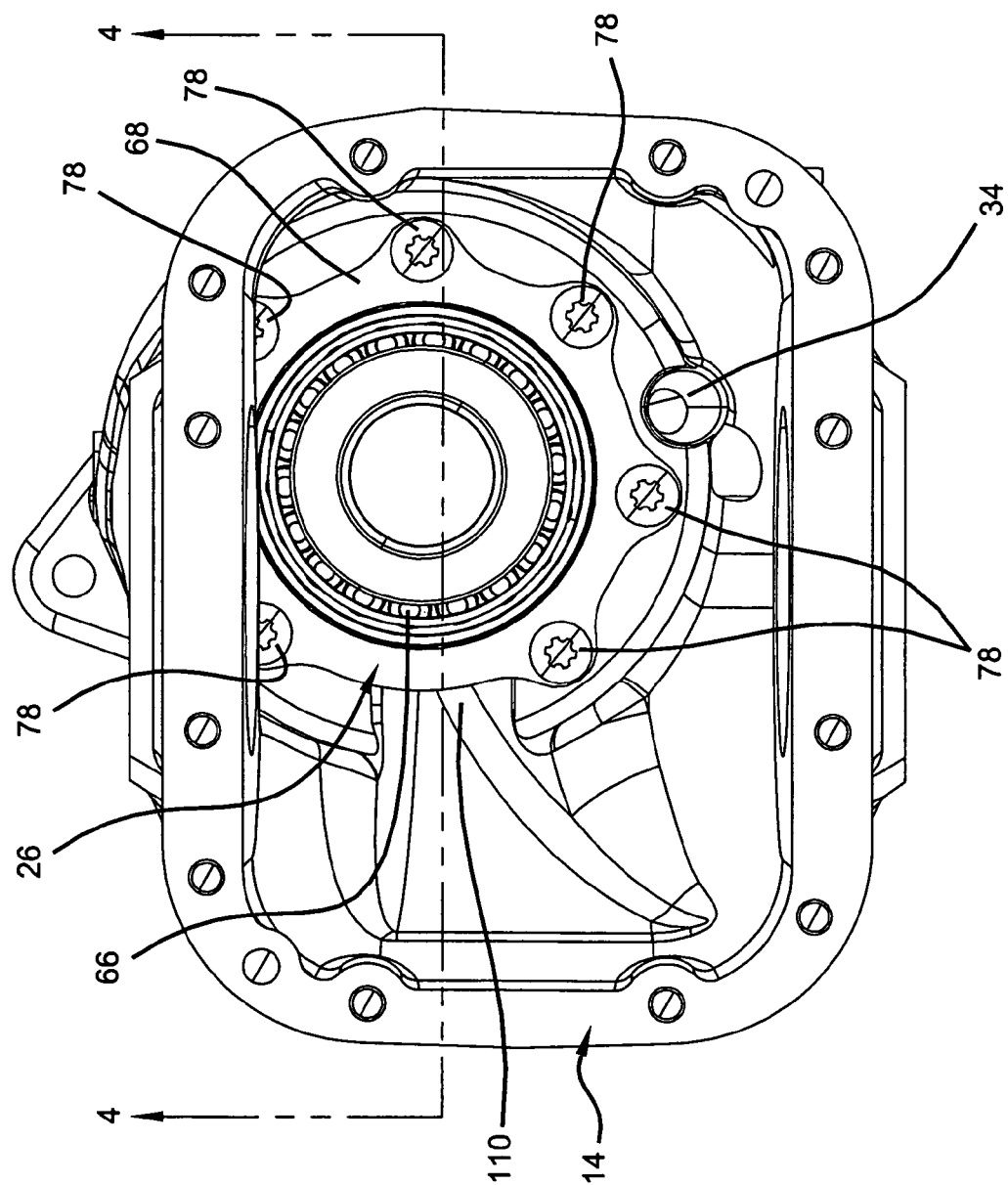
FIG. 3 is a plan view of an inner cavity of the axle housing shown with the differential assembly removed to illustrate a pinion unit secured to the axle housing according to the present invention.
Figure 5:
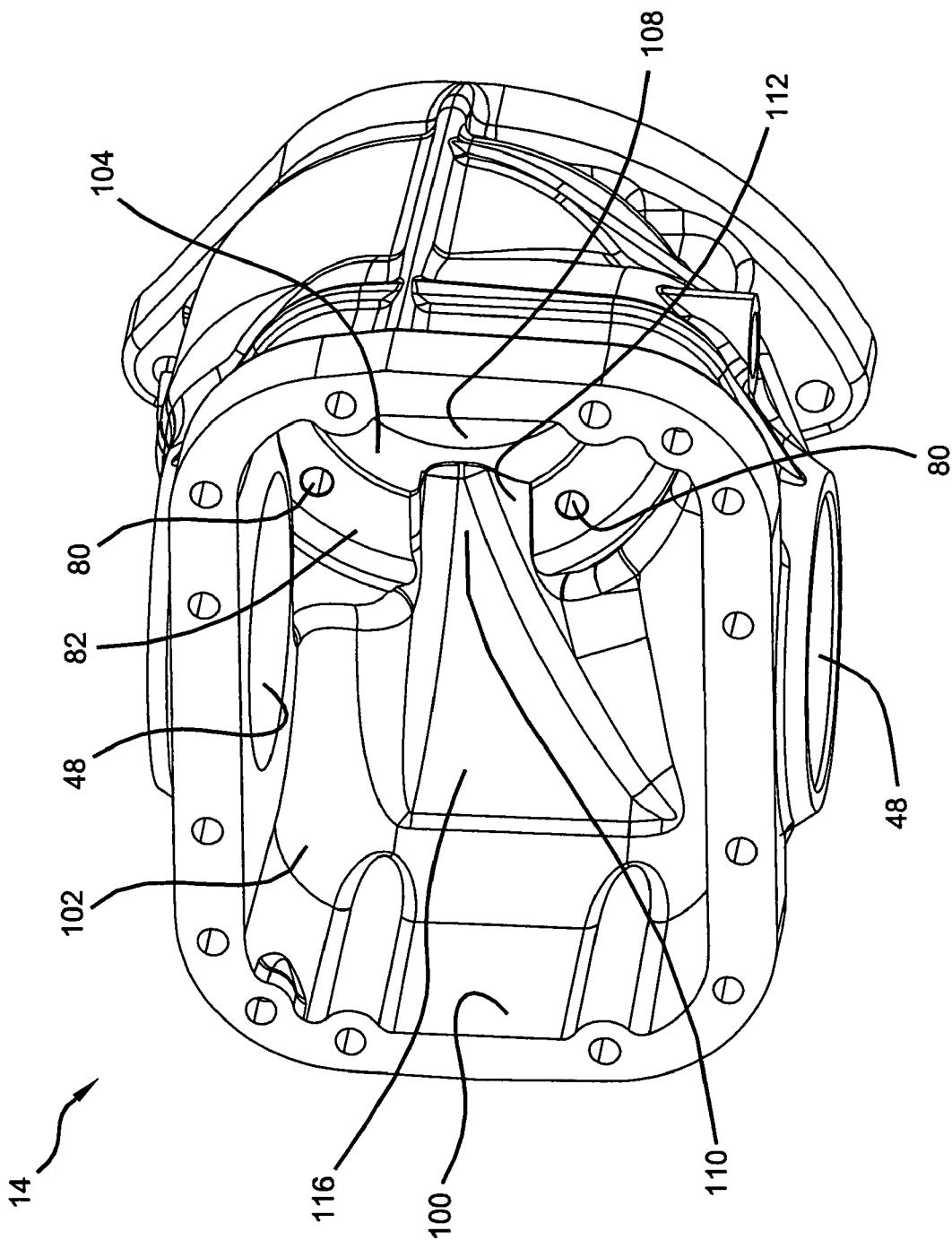
FIG. 5 is a perspective view of the axle housing according to the present invention.
Figure 6:
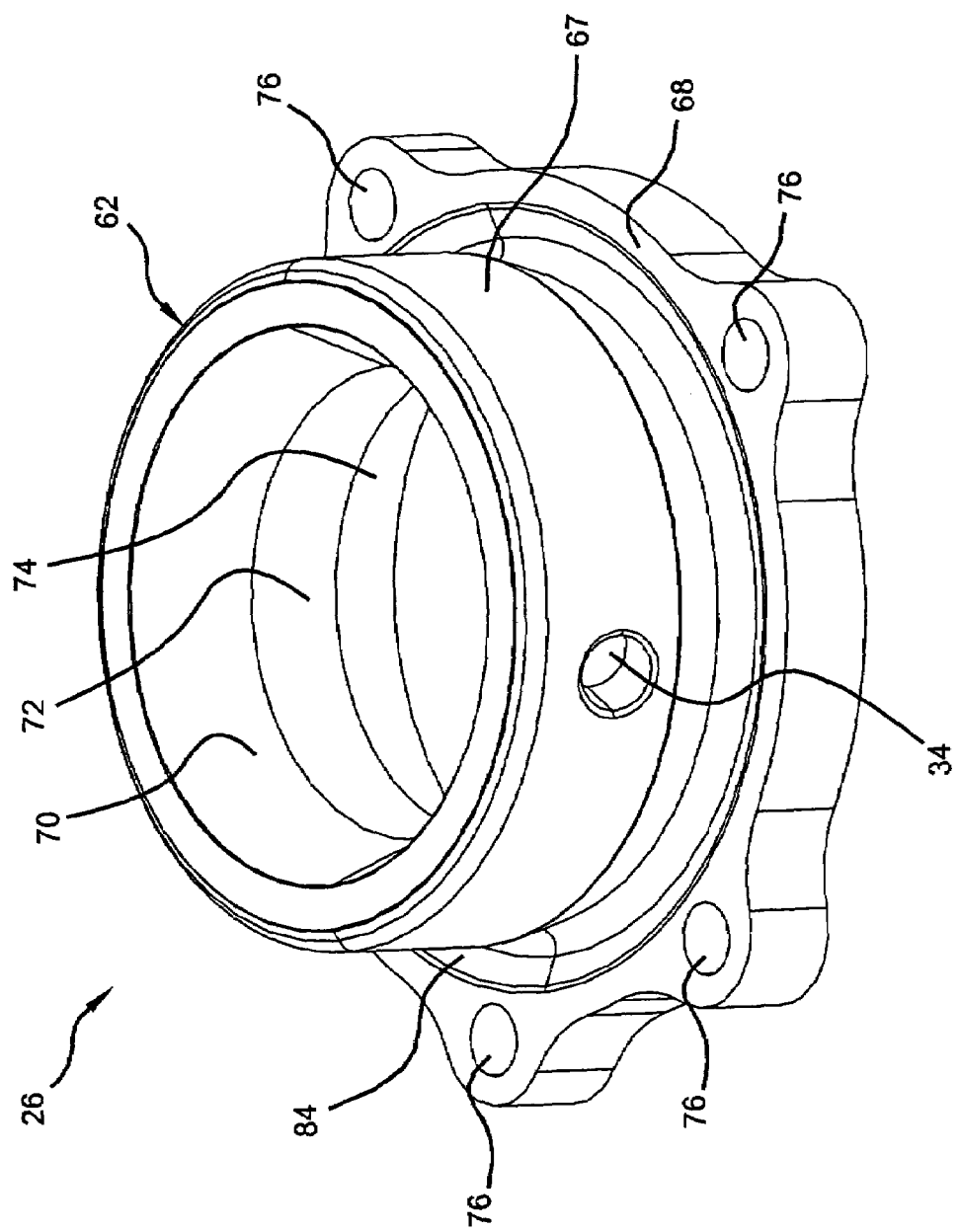
FIG. 6 is a perspective view of the pinion unit according to the present invention.

With reference now to FIGS. 3–5, axle housing 14 according to the present invention will now be described in greater detail. Axle housing 14 includes a main body portion 100 defining an internal cavity 102 that assists in feeding lubricant to oil feed passage 34. Axle housing 14 defines an inner circumferential surface 104 (FIGS. 4 and 5) extending between an outer face 106 (FIG. 4) and inner mounting surface 82 (FIG. 5). Inner circumferential surface 104 defines an inner circumferential opening 108 of axle housing 14. Cylindrical body portion 67 of the pinion unit 26 is received through opening 108 and is supported on inner circumferential surface 104.

A relief 110 is defined on main body 100. Relief 110 is formed through inner mounting surface 82 and extends through a portion of inner circumferential surface 104 (FIG. 5). Relief 110 generally defines a concave wall 112 having opposite ends terminating at inner mounting surface 82. The contour of relief 110 defines a transition-free extension from inner surface 116 of main body 100 of axle housing 14 to inner circumferential surface 104. More specifically, inner surface 116 of main body 100 comprises a consistent arcuate path through an area defined by relief 110 and to inner circumferential surface 104.

During operation, oil contained in internal cavity 102 of axle housing 14 flows through relief 110 and into the oil feed inlet 90 of oil feed path 34. Oil is directed through oil feed path 34 and exits at oil outlet 92. Oil flowing from oil outlet 92 is directed into the inboard and outboard tapered roller bearing units 64 and 66, respectively. The oil may then lubricate pinion gear 24. The flow path of oil repeats during operation of axle assembly 12.

The die casting required for axle housing 14 of the present invention is simplified. More specifically, relief portion 110 may be cast into axle housing 14 in a single step or, during the forming of axle housing 14 as a whole. As a result, the need for any additional processing required to form an oil feed channel is unnecessary. In this way, the manufacturing process is simplified.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An axle assembly comprising:
   an axle housing having a main body defining an internal cavity and a first and second opening for supporting first and second differential bearings respectively;

a differential assembly rotatably supported in said cavity of said axle housing by said first and second differential bearings; and wherein said main body defines an outer face, an inner mounting surface and an inner circumferential surface extending between said outer face and said inner mounting surface, said inner circumferential surface defining a third opening, said main body further defining a relief formed through said inner mounting surface and which extends through a portion of said inner circumferential surface, said relief defined by a concave wall extending across said main body which terminates at said inner mounting surface.

2. The axle assembly of claim 1 further comprising a pinion unit coupled to said inner mounting surface of said axle housing, said pinion unit supporting a pinion shaft via bearing assemblies.

3. The axle assembly of claim 2 wherein said pinion unit defines a passage through an outer circumferential wall.

4. The axle assembly of claim 3 wherein said relief defines a fluid communication path from said internal cavity of said axle housing to said passage in said pinion unit.

5. The axle assembly of claim 4 wherein said passage in said pinion unit communicates fluid from said relief to an outer circumference of said pinion bearing assemblies.

6. The axle assembly of claim 1 wherein the contour of said relief defines a transition-free extension from an inner wall surface of said main body to said inner circumferential surface.

7. The axle assembly of claim 3 wherein said pinion unit defines a flange portion extending from said outer circumferential wall, said flange portion including a plurality of boss portions receiving fasteners for securing said pinion unit to said axle housing.

8. The axle assembly of claim 6 wherein said inner wall surface of said main body is configured to provide an arcuate path between said relief and said inner circumferential surface.

9. An axle assembly comprising:
an axle housing having a main body and defining an internal cavity and first and second openings for supporting first and second differential bearings, respectively;
a differential assembly supported in said cavity in said axle housing by said first and second differential bearings;
a pinion unit having a flange portion coupled to said axle housing and supporting a pinion bearing assembly; and
wherein said main body of said axle housing defines an inner circumferential surface defining a third opening for supporting said pinion unit therein, said main body defining an inner mounting surface locating said flange portion of said pinion unit, said inner mounting surface having a relief formed therethrough which extends through a portion of said inner circumferential surface said relief defined by a concave wall extending across said main body which terminates at said inner mounting surface.

10. The axle assembly of claim 9 wherein said pinion unit defines a passage through an outer circumferential wall.

11. The axle assembly of claim 10 wherein said relief defines a fluid communication path from said internal cavity of said axle housing to said passage in said pinion unit.

12. The axle assembly of claim 11 wherein said passage in said pinion unit communicates fluid from said relief to an outer circumference of said pinion bearing assembly.

13. The axle assembly of claim 9 wherein the contour of said relief defines a transition-free extension from an inner wall surface of said main body to said inner circumferential surface.

14. The axle assembly of claim 9 wherein said flange portion includes a plurality of boss portions receiving fasteners for securing said pinion unit to said axle housing.

15. The axle assembly of claim 13 wherein said inner wall surface of said main body is configured to provide an arcuate oath between said relief and said inner circumferential surface.

16. An axle assembly comprising:
an axle housing having a main body including an inner surface and defining an internal cavity, said axle housing having a first and second opening defined in said main body for supporting a first and second differential bearing respectively;
a pinion unit having a flange portion coupled to said axle housing and supporting a pinion bearing assembly; and
wherein said main body of said axle housing defines an inner circumferential surface defining a third opening and accepting said pinion unit therethrough, said main body defining an inner mounting surface locating said flange portion of said pinion unit, said inner mounting surface having a relief formed therethrough and extending through a portion of said inner circumferential surface, said relief defined by a concave wall extending through said main body and terminating at opposite ends at said inner mounting surface.

17. The axle assembly of claim 16 wherein said relief defines a transition-free surface extension from said inner surface of said main body to said inner circumferential surface of said main body.

18. The axle assembly of claim 17 wherein said pinion unit defines a passage through an outer circumferential wall.

19. The axle assembly of claim 18 wherein said relief defines a fluid communication path from said internal cavity of said axle housing to said passage in said pinion unit.

20. The axle assembly of claim 19 wherein said passage in said pinion unit communicates fluid from said relief to an outer circumference of said pinion bearing assembly.

21. An axle assembly comprising:
a differential assembly having a ring gear;
a pinion shaft having a pinion gear meshed with said ring gear;
an axle housing defining an internal cavity and first, second and third openings, said third opening defined by an inner mounting surface, an outer face surface and circumferential wall surface therebetween;
first and second differential bearings rotatably supporting said differential assembly in said first and second openings of said axle housing;
a pinion bearing rotatably supporting said pinion shaft in said third opening of said axle housing; and
a fluid communication path formed in said internal cavity for supplying lubricant to said pinion bearing, said inner mounting surface of said third opening having a relief formed therein which extends through a portion of said inner circumferential surface and is defined by a concave wall terminating at said inner mounting surface, said relief is configured to direct lubricant to said pinion bearing.

* * * * *